US011982210B2

(12) United States Patent
Schiavo

(10) Patent No.: US 11,982,210 B2
(45) Date of Patent: May 14, 2024

(54) TRANSITION SYSTEM SIDE SEAL FOR GAS TURBINE ENGINES

(71) Applicant: Siemens Energy Global GmbH & Co. KG, Munich (DE)

(72) Inventor: Anthony L. Schiavo, Oviedo, FL (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/647,907

(22) Filed: Jan. 13, 2022

(65) Prior Publication Data

US 2022/0136396 A1 May 5, 2022

Related U.S. Application Data

(63) Continuation of application No. 16/071,090, filed as application No. PCT/US2016/015048 on Jan. 27, 2016, now Pat. No. 11,255,201.

(51) Int. Cl.
*F01D 9/02* (2006.01)
*F01D 11/00* (2006.01)
*F01D 25/12* (2006.01)

(52) U.S. Cl.
CPC ............ *F01D 9/023* (2013.01); *F01D 11/005* (2013.01); *F01D 25/12* (2013.01); *F05D 2230/60* (2013.01); *F05D 2240/35* (2013.01); *F05D 2240/55* (2013.01); *F05D 2260/20* (2013.01)

(58) Field of Classification Search
CPC .......... F01D 9/02; F01D 9/023; F01D 11/005; F01D 25/12; F05D 2230/60; F05D 2240/35; F05D 2240/55; F05D 2260/20; F02C 7/28; F23R 3/00; F16J 15/00
See application file for complete search history.

(56) References Cited

U.S. PATENT DOCUMENTS

| | | | | |
|---|---|---|---|---|
| 6,162,014 A * | 12/2000 | Bagepalli | F01D 11/005 | 277/630 |
| 2003/0039542 A1* | 2/2003 | Cromer | F01D 11/005 | 415/135 |
| 2009/0072497 A1* | 3/2009 | Kunitake | F02C 7/28 | 277/644 |
| 2010/0054928 A1* | 3/2010 | Schiavo | F01D 25/243 | 415/182.1 |
| 2010/0061837 A1* | 3/2010 | Zborovsky | F01D 9/023 | 415/58.4 |
| 2011/0304104 A1* | 12/2011 | McMahan | F01D 9/023 | 277/637 |

* cited by examiner

*Primary Examiner* — Loren C Edwards

(57) ABSTRACT

A gas turbine engine has transition ducts. Between two adjacent transition ducts there are transition side grooves that extend in a radial direction. A side seal is radially inserted into the transition side grooves. The side seal resiliently engages the transition side grooves to accommodate a thermo-mechanical stress that develops between the two adjacent transition ducts.

11 Claims, 18 Drawing Sheets

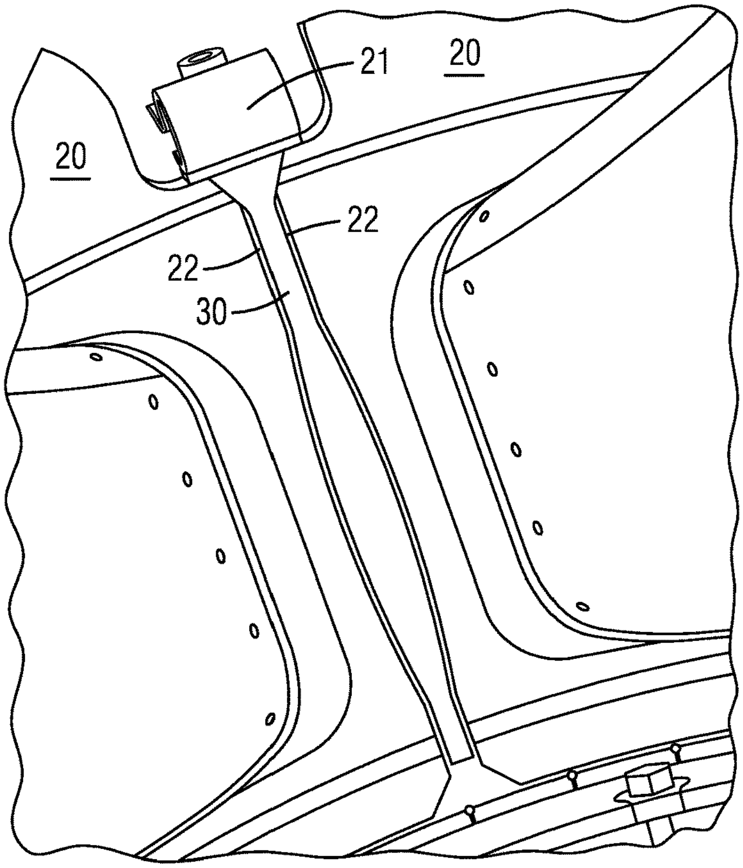
FIG 3
FIG 4
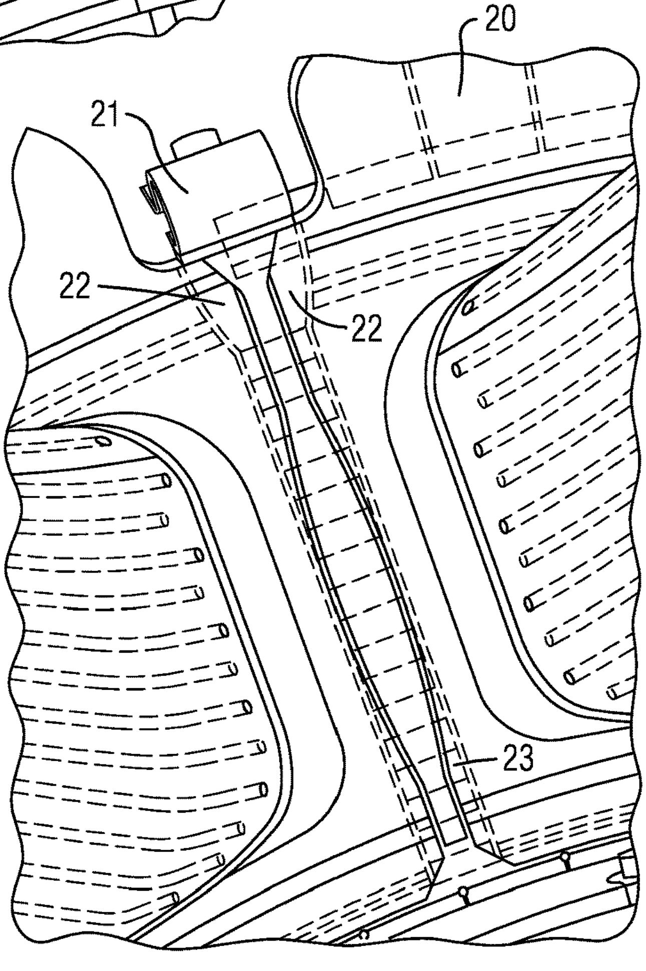

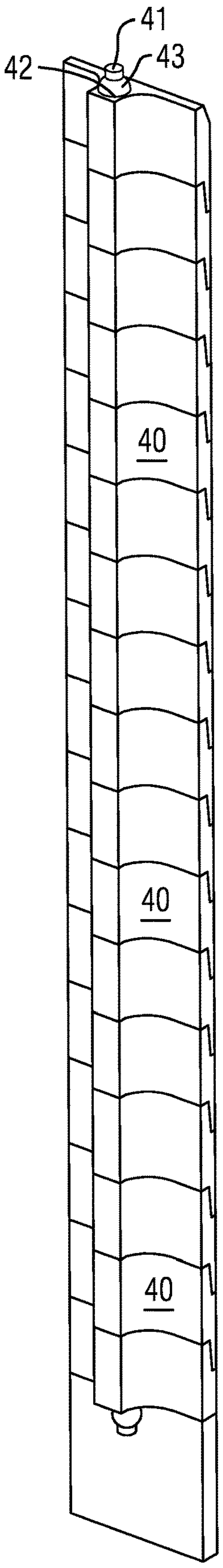
FIG 17
FIG 18
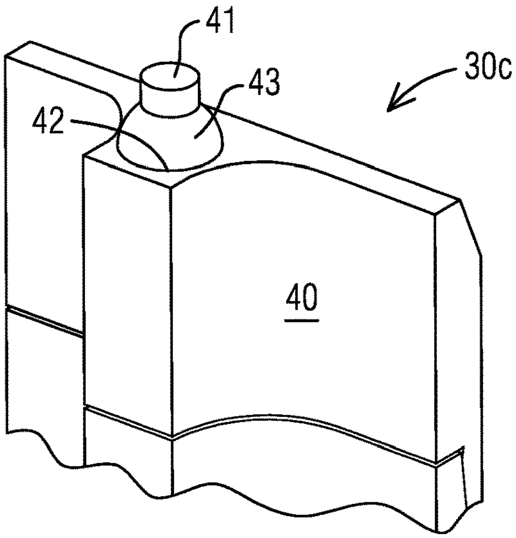
FIG 19
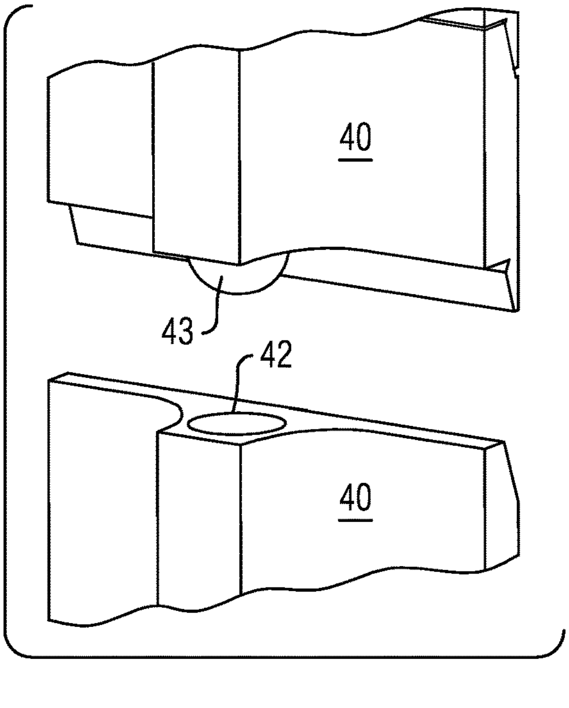

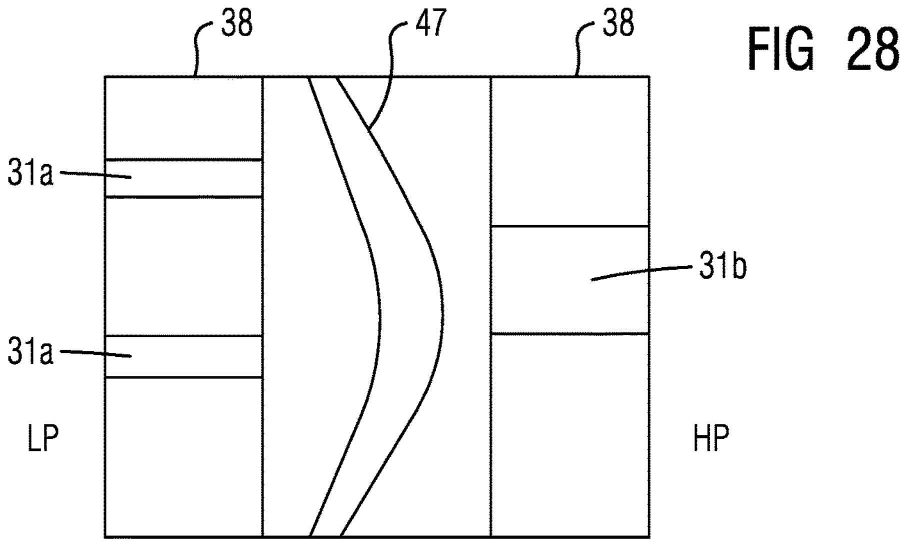
FIG 28
FIG 29
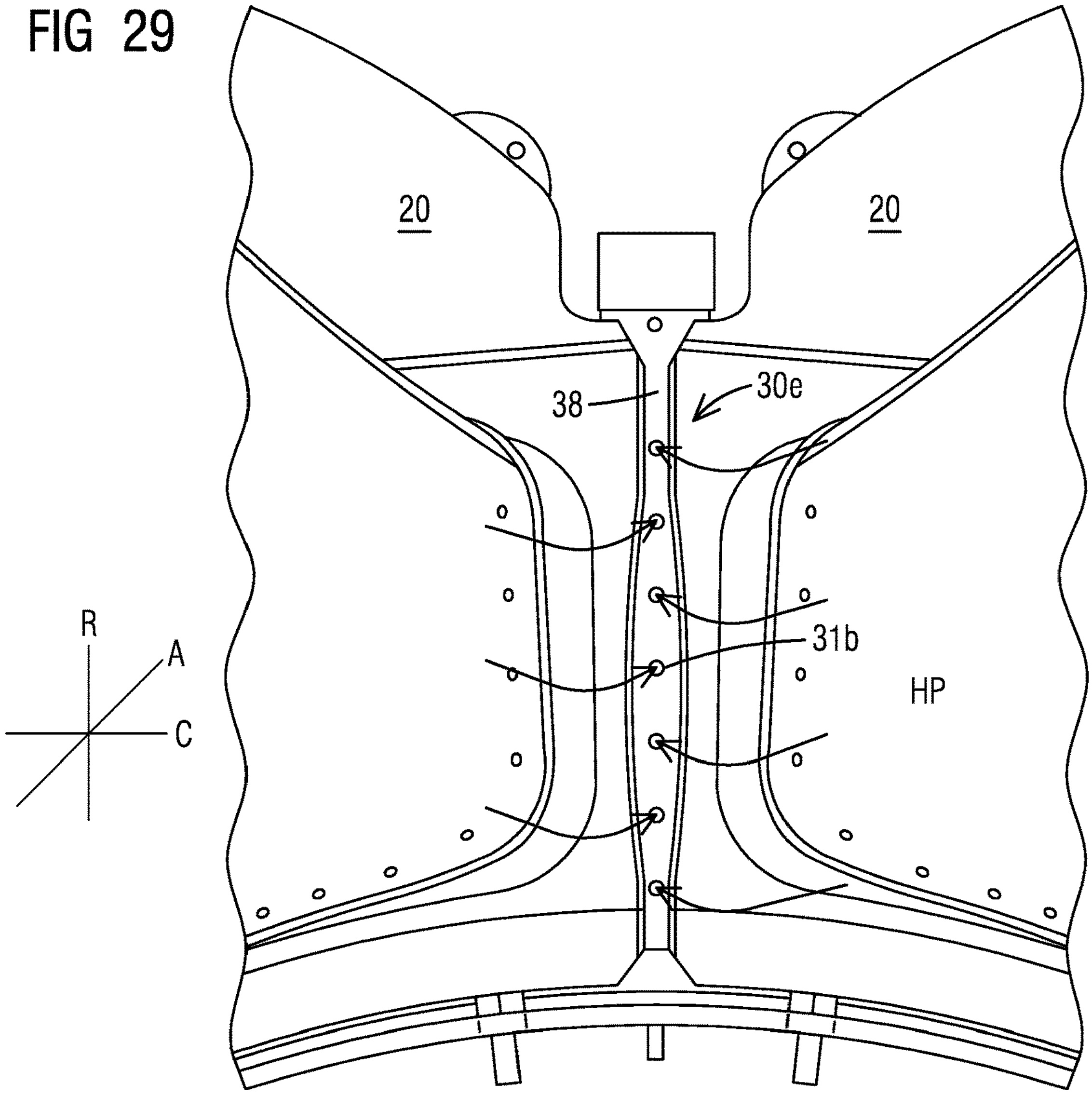

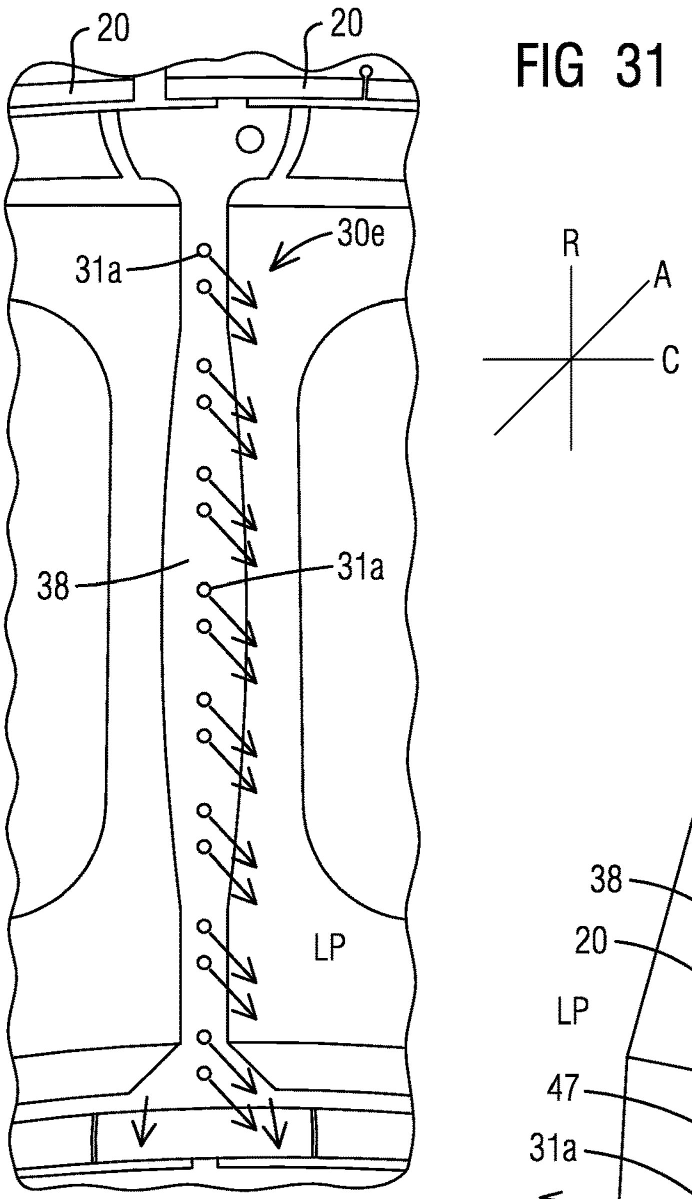
FIG 31
FIG 32
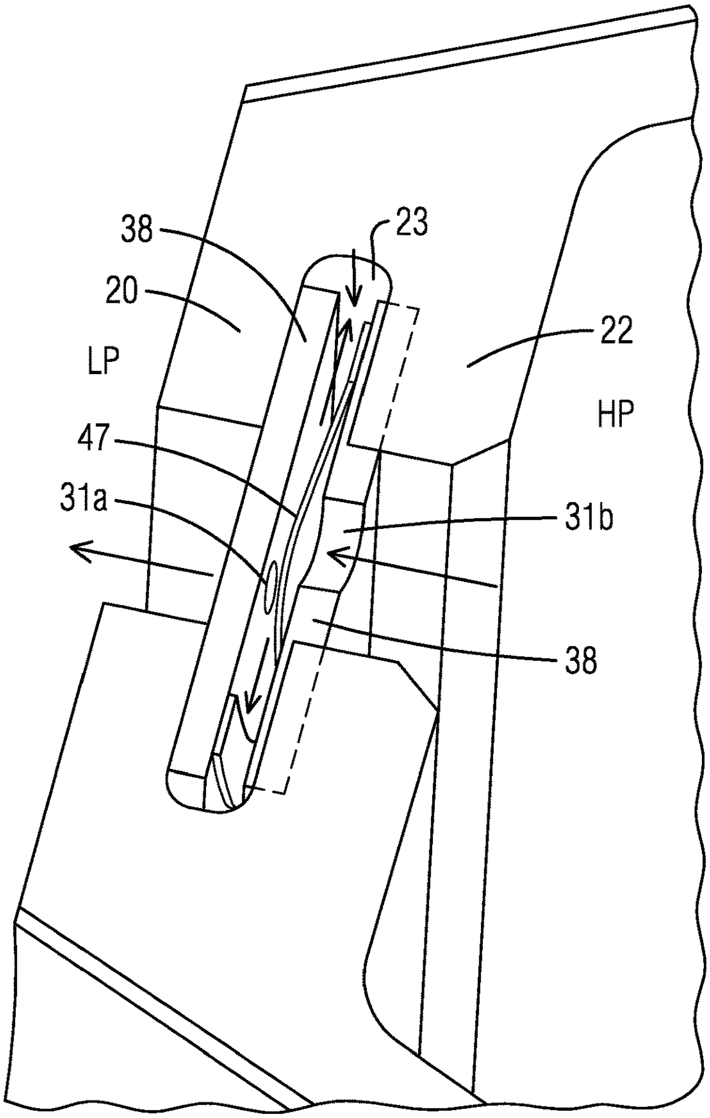

TRANSITION SYSTEM SIDE SEAL FOR GAS TURBINE ENGINES

BACKGROUND

1. Field

Disclosed embodiments are generally related to gas turbine engines and, more particularly to the transition system of a gas turbine engine.

2. Description of the Related Art

Gas turbine engines with can annular combustors have transition ducts to conduct and direct the gasses from the combustors to rows of turbine blades. The transition ducts as well as vanes orient the combustion gas flow streams to contact the turbine blades at preferred angles for rotation of the blades.

In some gas turbine engines, the transition ducts are arranged in an annular array. The spaces between adjacent transition ducts may permit compressor discharge air to bypass the combustion system. Therefore effective sealing of the spaces between adjacent transition ducts is desired.

SUMMARY

Briefly described, aspects of the present disclosure relate to side seals used in gas turbine engines.

An aspect of the disclosure may be a gas turbine engine having a first transition duct and a second transition duct, wherein the first transition duct has a first transition side rail having a first transition side groove and the second transition duct has a second transition side rail having a second transition side groove, wherein the first transition side groove and the second transition side groove extend in a radial direction. A side seal is inserted between the first transition duct and the second transition duct in the first transition side groove and the second transition side groove, wherein the side seal is disposed between a high pressure area and a low pressure area. The side seal resiliently engages the first transition side groove and the second transition side groove while accommodating thermo-mechanical stress that develops in a radial direction, the axial direction and a circumferential direction between the first transition duct and the second transition duct wherein the side seal includes a plurality of cooling features lengthwise disposed in the side seal that permit passing a restricted amount of cooling air from the high pressure area through the side seal to cool the side seal.

Another aspect of the present disclosure may be a gas turbine engine comprising a first transition duct and a second transition duct, wherein the first transition duct has a first transition side rail having a first transition side groove and the second transition duct has a second transition side rail having a second transition side groove, wherein the first transition side groove and the second transition side groove extend in a radial direction. A side seal is inserted between the first transition duct and the second transition duct in the first transition side groove and the second transition side groove, wherein the side seal separates a high pressure area from a low pressure area. The side seal comprises a biasing structure to compressively and resiliently engage the first transition side groove and the second transition side groove, while accommodating thermo-mechanical stresses that develop in a radial direction, the axial direction and a circumferential direction between the first transition duct and the second transition duct.

Still another aspect of the present disclosure may be a gas turbine engine comprising a first transition duct and a second transition duct, wherein the first transition duct has a first transition side rail having a first transition side groove and the second transition duct has a second transition side rail having a second transition side groove, wherein the first transition side groove and the second transition side groove extend in a radial direction. A side seal is inserted between the first transition duct and the second transition duct in the first transition side groove and the second transition side groove, wherein the side seal separates a high pressure area from a low pressure area. The side seal resiliently engages the first transition side groove and the second transition side groove while accommodating thermo-mechanical stresses that develop in a radial direction, the axial direction and a circumferential direction between the first transition duct and the second transition duct. The side seal also comprises a plurality of stacked articulating segments to accommodate the thermo-mechanical stresses.

Still another aspect, a gas turbine engine includes a first transition duct including a first transition side rail having a first transition side groove that extends in a radial direction; a second transition duct adjacent to the first transition duct, the second transition duct including a second transition side rail having a second transition side groove that extends in the radial direction; and a side seal radially inserted into the first transition side groove and the second transition side groove, the side seal including an upper body portion; a lower body portion; and a resilient feature that resiliently engages the first transition side groove and the second transition side groove to accommodate a thermo-mechanical stress that develops between the first transition duct and the second transition duct.

Still another aspect, a gas turbine engine includes a first transition duct including a first transition side rail having a first transition side groove that extends in a radial direction; a second transition duct adjacent to the first transition duct, the second transition duct including a second transition side rail having a second transition side groove that extends in the radial direction; and a side seal radially inserted into the first transition side groove and the second transition side groove, the side seal including an upper body portion; a lower body portion; and a layer of metal cloth surrounding the lower body portion.

BRIEF DESCRIPTION OF THE DRAWINGS

FIG. 3 shows a close up view of the junction between two adjacent transition ducts with a side seal.

FIG. 4 shows a transparent view of the junction between the two adjacent transition ducts with a side seal.

FIG. 10 is a view of the interior of the side seal shown in FIG. 6 inserted between adjacent transition ducts as.

FIG. 17 shows a side seal made in accordance with an embodiment of the present invention.

FIG. 18 is a close up view of the top of the side seal shown in FIG. 17.

FIG. 19 is a close up view of the side seal shown in FIG. 17 with two segments separated.

FIG. 28 is a diagrammatic view of the interior of side seal shown in FIG. 26.

FIG. 29 is a view of the side seal shown in FIG. 26 inserted between adjacent transition ducts as viewed from the high pressure side.

FIG. 31 is a view of the side seal shown in FIG. 26 inserted between adjacent transition ducts as viewed from the low pressure side.

FIG. 32 is a view of the side seal shown in FIG. 26 inserted between adjacent transition ducts.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
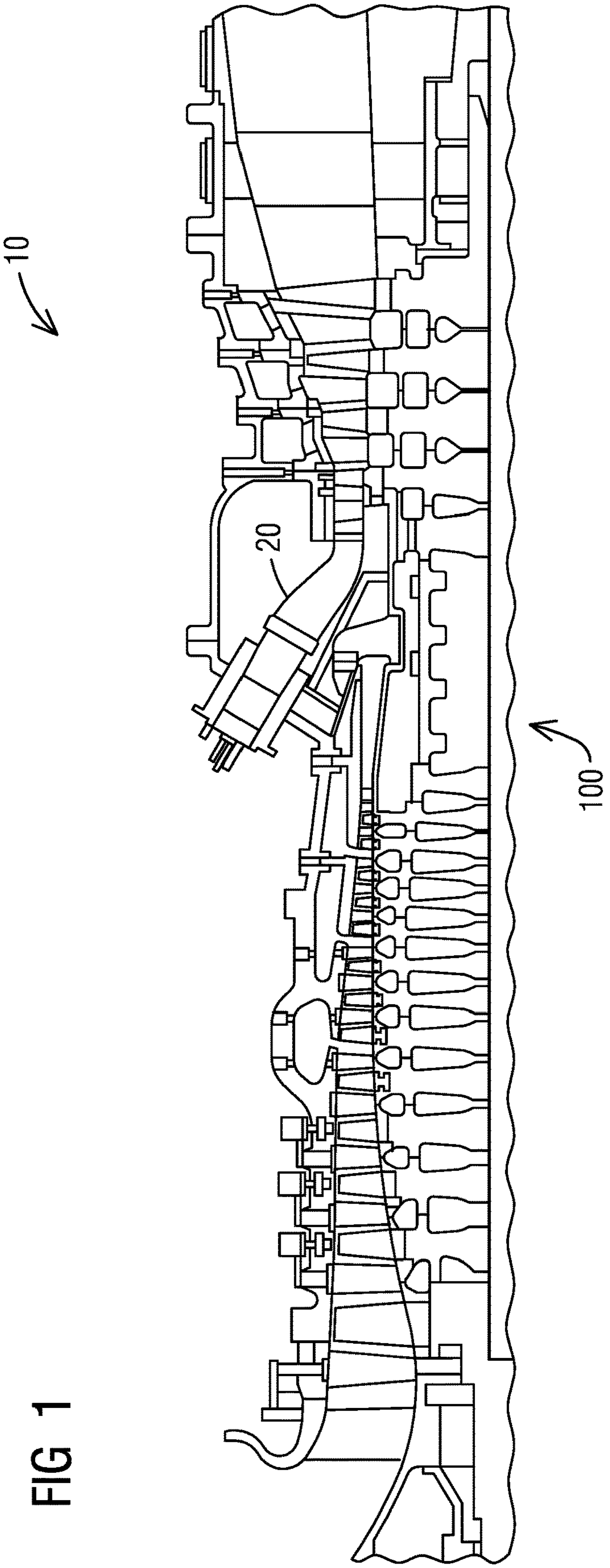
FIG. 1 shows a side cross-sectional view of a gas turbine engine.
Figure 2:
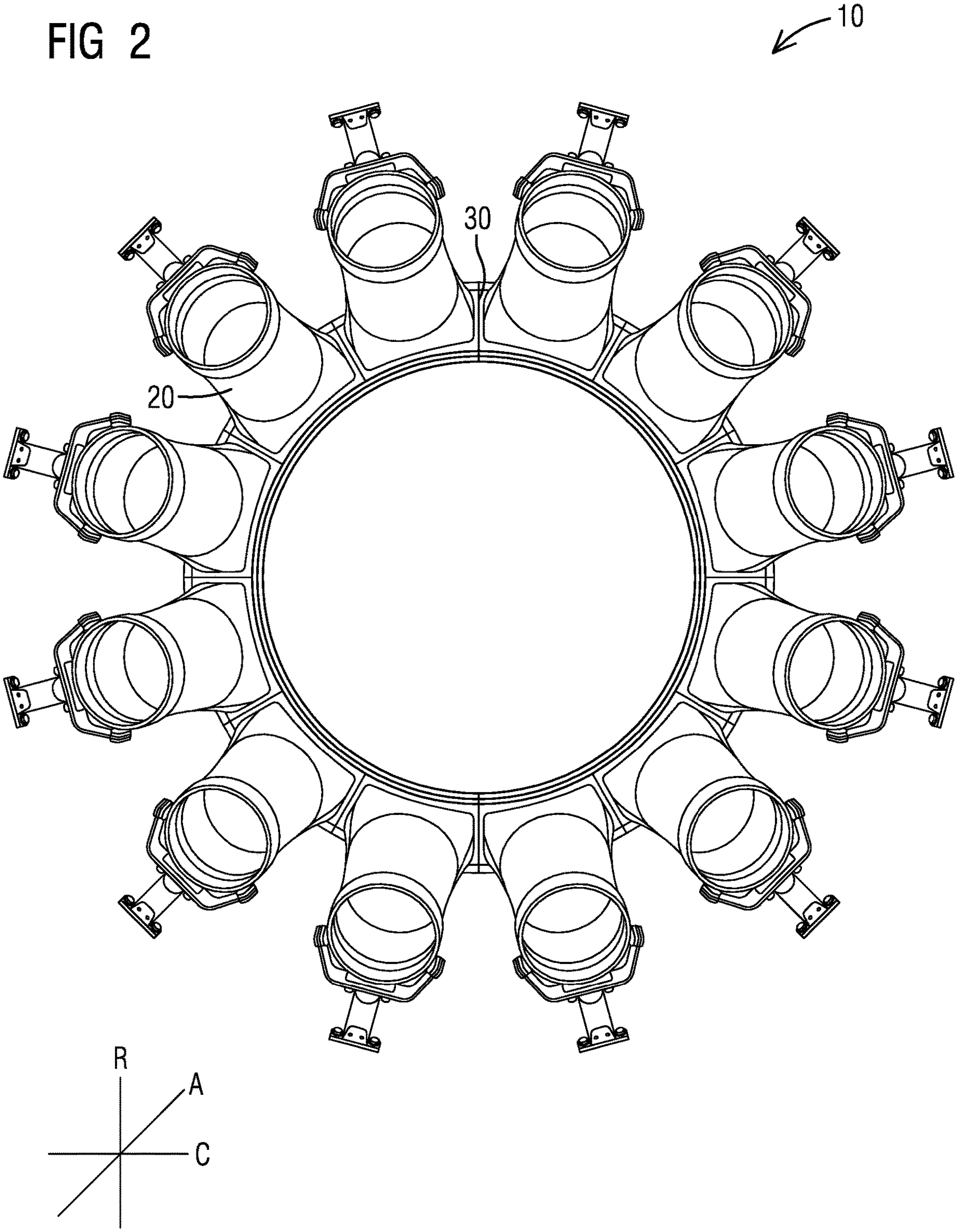
FIG. 2 shows a top down view of a transition system.

FIG. 1 shows a cross-sectional view of a gas turbine engine 100 showing transition system 10 having transition ducts 20. FIG. 2 shows a top down view of a transition system 10 with engine structures and combustion system removed for ease of view. The transition ducts 20, shown in FIG. 2 form a ring with adjacent transition ducts 20 having side seals 30 placed between each transition duct 20. FIG. 3 shows a close up view of the side seal 30 and adjacent transition ducts 20. After placement of the side seal 30 an outer seal 21 is placed on top of side seal 30. FIG. 4 shows a transparent view of the junction between the two adjacent transition ducts 20 with the side seal 30.

Figure 5:
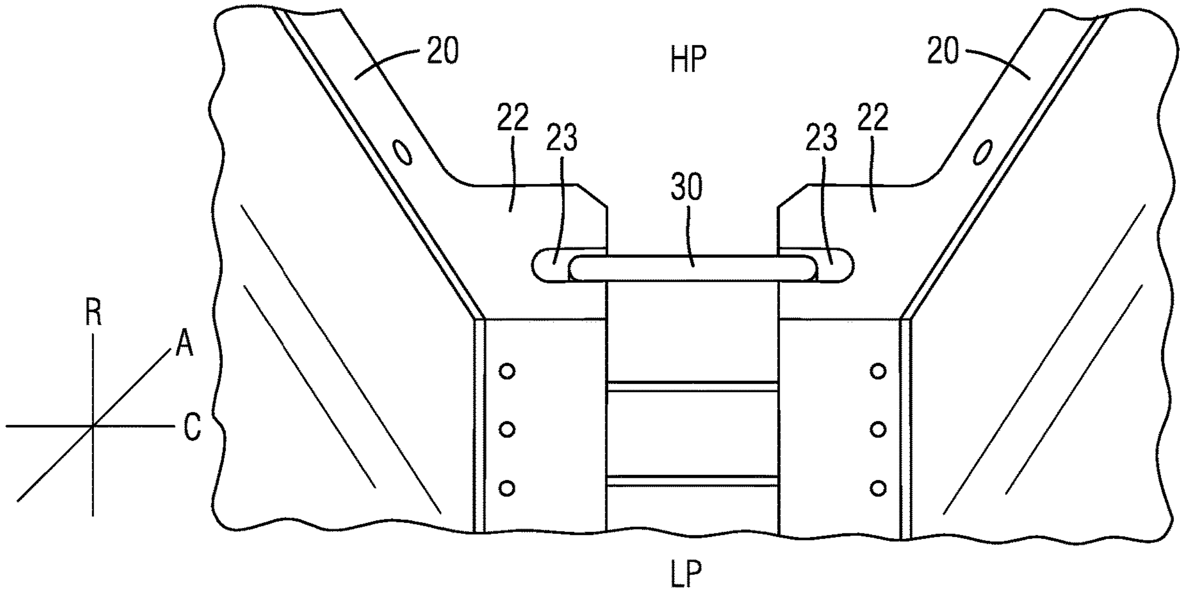
FIG. 5 shows a close up view of a side seal between the two adjacent transition ducts without an upper body portion for clarity.

FIG. 5 shows a close up view of the side seal 30 located between the transition ducts 20 with upper portion removed for ease of viewing. Formed in the transition side rail 22 is a transition side groove 23 that runs the length of the transition side rail 22 and extends in a radial direction. The transition side groove 23 may be milled into the transition ducts 20 and receives the side seal 30. Outside of the ring formed by the transitions ducts 20 is a high pressure area HP. Located in the interior of the ring is a low pressure area LP.

The side seals 30 and transition side grooves 23 may be subject to excessive wear due to the operation of the gas turbine engine 100. Wear can be caused by loose fits between the side seal 30 and the transition ducts 20. Loose fitting of the side seal 30 permits the side seal 30 to vibrate during operation of the gas turbine engine 100. Other contributing factors to the wear of the side seals 30 is thermo-mechanical deformation of the transition ducts 20 as the gas turbine engine 100 cycles through loading. Stresses can occur in the radial direction R, the circumferential direction C and the axial direction A as shown in FIG. 5. The radial direction R is the direction towards the inside of the ring of transition ducts 20. The circumferential direction C is the direction along the circumference of the ring formed by the transition ducts 20. The axial direction A is the direction that extends through the center of the ring formed by the transition ducts 20. The wear caused by the thermo-mechanical stresses can result in material thinning of the side seal 30, as well as the the transition side rails 22 of the transition ducts 20 shown in FIGS. 3, 4 and FIG. 5. Also, the high temperatures seen at the location of the side seals 30 may contribute to the wear of the side seals 30 and reduces the life of the transition exit structure.

Figure 6:
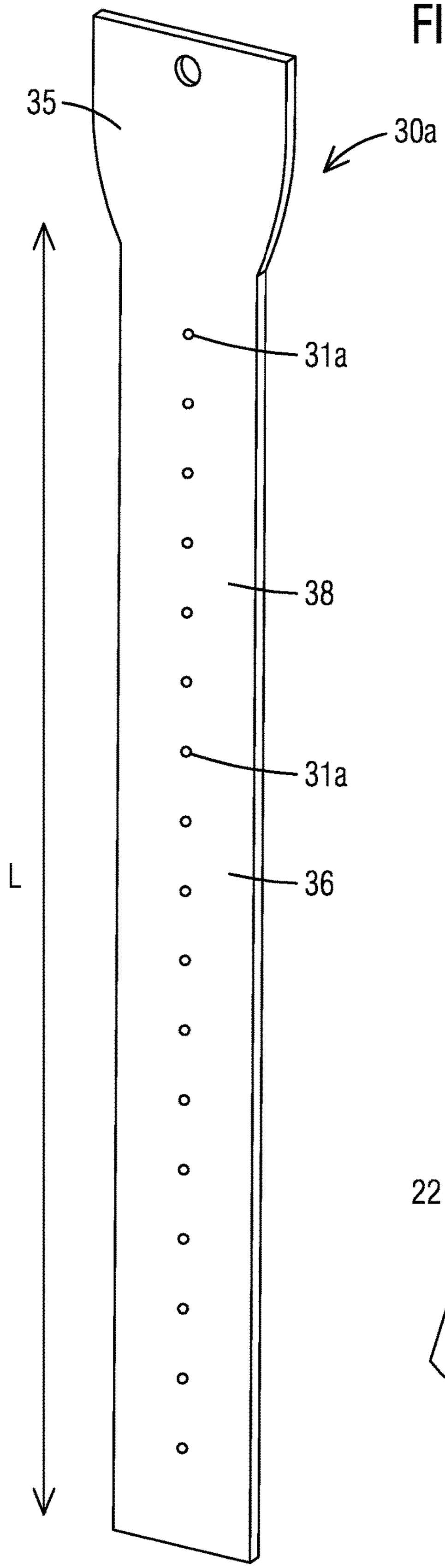
FIG. 6 shows a side seal having a mesh made in accordance with an embodiment of the present disclosure.

FIG. 6 shows a side seal 30*a* made in accordance with an embodiment of the present invention. The side seal 30*a* is formed with a mesh 37, preferably the mesh 37 may be a three dimensional woven mesh. A "three dimensional woven mesh" strands of material woven together to create interlacing between the X, Y and Z directions of a fabric form; weaving with this process creates thickness. The thickness is used as filler for a transition side groove 23. The 3D interlacing of strands creates an interlocking woven structure with a matrix of voids. The matrix of voids are used as a plenum to complete a cooling circuit from a high pressure HP side to a low pressure LP side. Additionally, the mesh 37 sandwiched between the material sheets 38 provides the needed design thickness. The thickness is driven by the predicted design life in combination with conventional milling capability of the transition side grooves 23. Furthermore, the grid of 3D strands in a 3D woven mesh permit flexing and resiliency when the side seal 30*a* is in the transition side grooves 23 during thermal deformation of the transition duct 20. The mesh 37 can be attached to the material sheets 38 by surface brazing, edge spot welding or laser welding. These methods of fabrication can be used on all the side seal arrangements within the disclosure.

Shown in FIG. 6 side seal 30*a* has an upper body portion 35 and a lower body portion 36. The lower body portion 36 is placed within the transition side grooves 23. As shown the lower body portion 36 has a width that is smaller than the upper body portion 35. The upper body portion 35 is used in centering and for removing the side seal 30*a* from the transition side grooves 23. The lower body portion 36 is formed from material sheets 38 and mesh 37. Formed in the lengthwise direction in the material sheets 38 are cooling features that are formed along the length of the lower body portion 36. In the embodiment shown in FIG. 6 the cooling features are apertures 31*a*.

Figure 7:
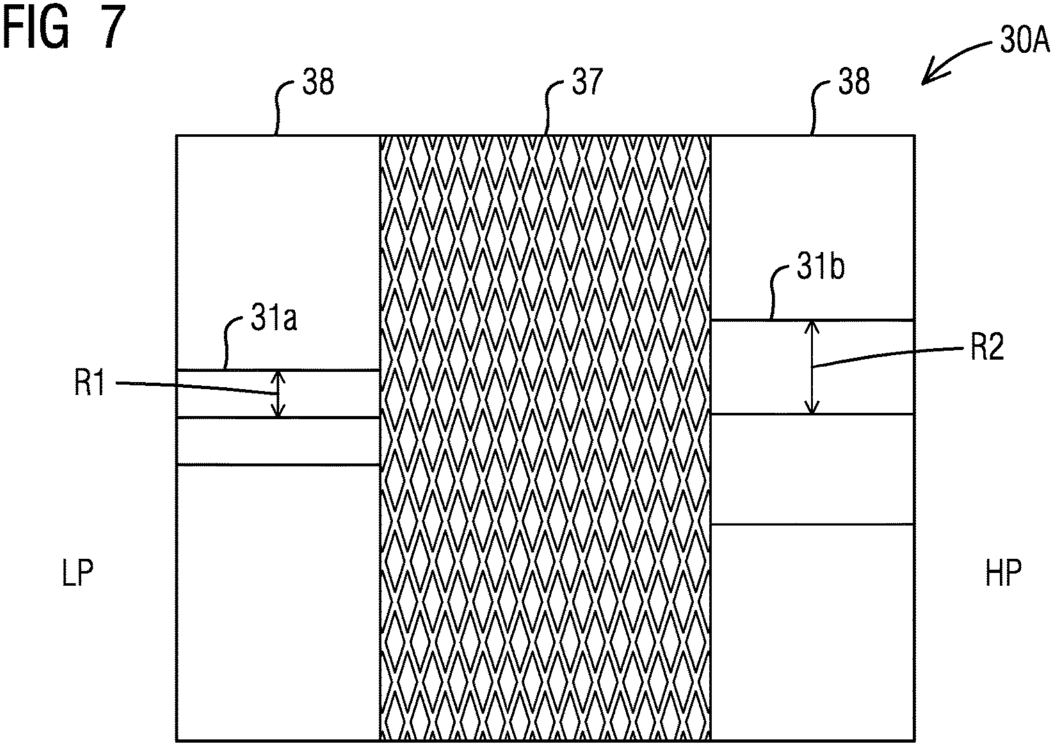
FIG. 7 is a diagrammatic view of the interior of side seal shown in FIG. 6.

As shown in FIG. 7, the mesh 37 is a 3D woven mesh that is sandwiched between material sheets 38, material sheets 38 may made of a metallic material such as Haynes 188, which is a cobalt, nickel, chromium and tungsten alloy. However, it should be understood that other suitable alloys and materials may be used to form the material sheets 38. The thickness of material sheets 38 is determined based on an acceptable wear rate for a given design life. Preferably the material sheets 38 are as thin as possible to gain the best flexibility. Preferably the range of the sheet thickness should be between 0.1 mm to 1.0, preferably less than 0.7 mm. The thickness of the mesh 37 is preferably greater than the thickness of the material sheet 38 impacted by pressure. Formed in the material sheets 38 are cooling features. The apertures 31*a* and apertures 31*b* that are located in the material sheets 38 function as cooling features. There is a plurality of apertures 31*a* formed on the material sheet 38 that faces the low pressure area LP in the transition system 10. There is also a plurality of apertures 31*b* formed in the material sheet 38 that faces the high pressure area HP of the transition system 10. Apertures 31*a* have a radius R1 that is smaller than the radius R2 of the apertures 31*b*. The use of apertures 31*a* having a radius R1 smaller than the radius R2 permits a restricted flow of air through the side seal 30*a*. Apertures 31*a* and apertures 31*b* having different radii permit a controlled flow of air by limiting the flow of air exiting from the side seal 30*a*.

Figure 8:
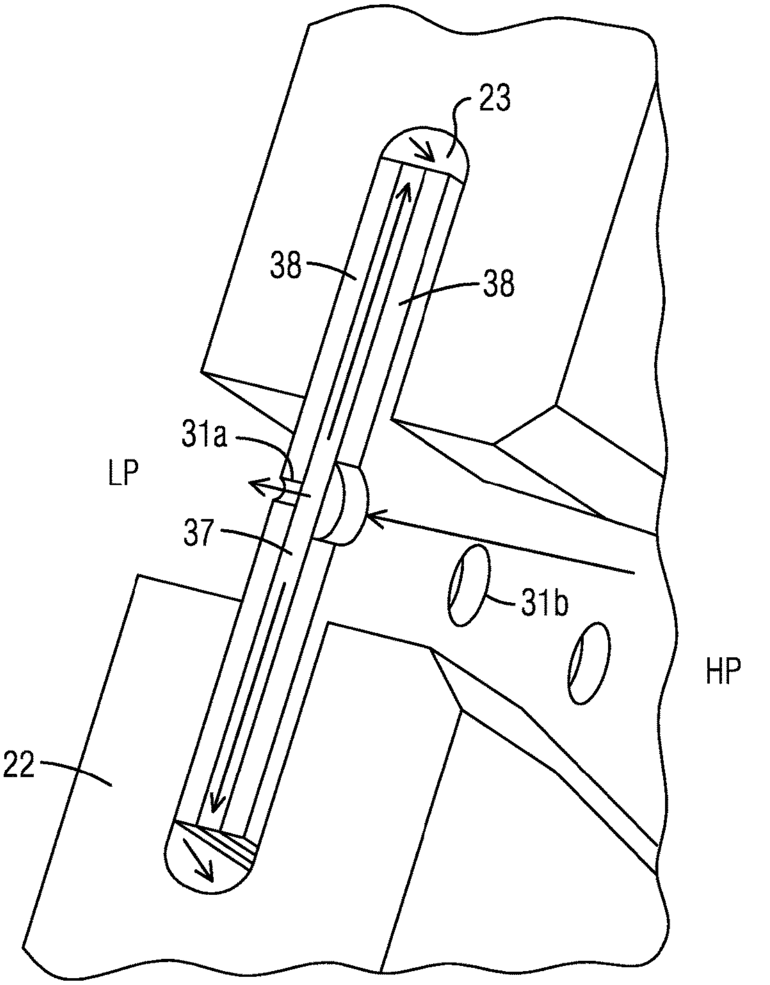
FIG. 8 is a top down view of the side seal shown in FIG. 6 inserted between adjacent transition ducts.

FIG. 8 shows a top down view of the side seal 30*a* shown in FIG. 6 inserted between adjacent transition ducts 20. In the view shown the top body portion 35 is not shown so as to provide a clearer view of the side seal 30*a*. FIG. 8 shows air from the high pressure area HP passes through the plurality of apertures 31*b* and through the mesh 37. The mesh 37 permits air that enters through the apertures 31*b* to pass through out and through the mesh 37. The cooling flow of air provides cooling of the side seal 30*a* and the transition side grooves 23 and reduces wear caused by heat.

Figure 9:
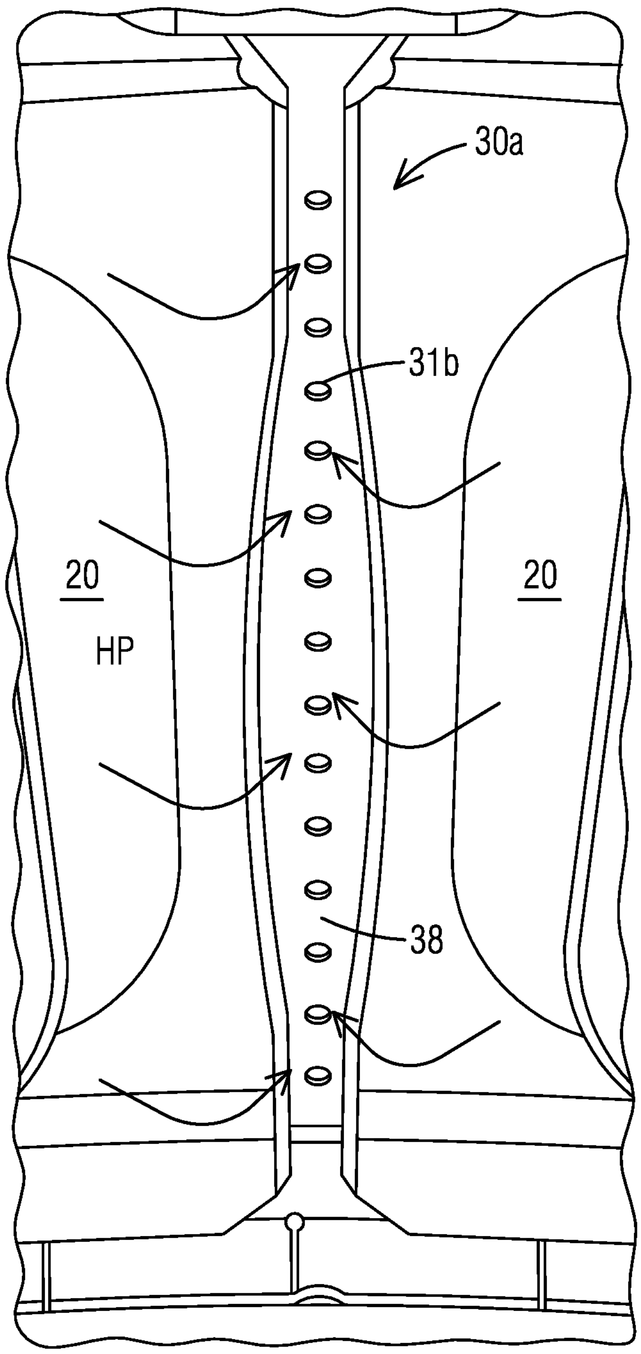
FIG. 9 is a view of the side seal shown in FIG. 6 inserted between adjacent transition ducts as viewed from the high pressure side.
Figure 10:
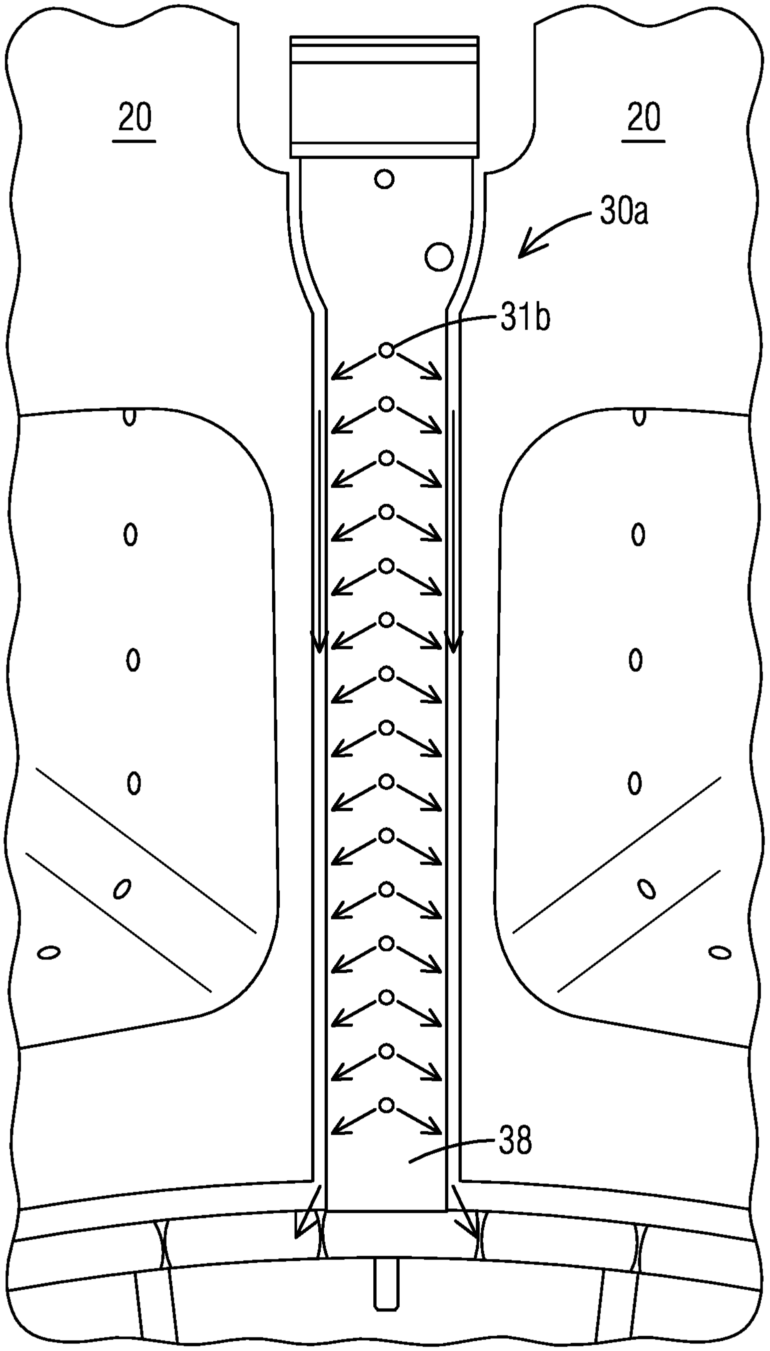
Figure 11:
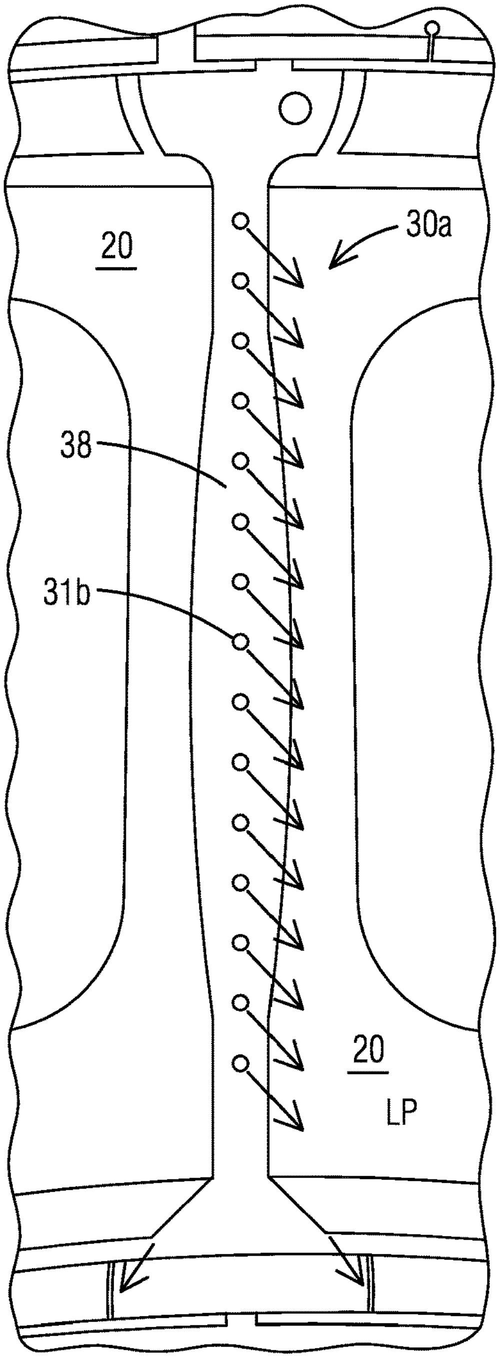
FIG. 11 is a view of the side seal shown in FIG. 6 inserted between adjacent transition ducts as viewed from the low pressure side.

FIG. 9 is a view of side seal 30*a* located between the transition ducts 20 that shows the cooling air entering into the apertures 31*b* from the high pressure area HP. FIG. 10 shows the interior of the side seal 30*a* (without mesh 37) illustrating the passage of cooling air through the interior of the side seal 30*a*. FIG. 11 shows the exiting of cooling air from the side seal 30*a* through apertures 31*a* into the low pressure area LP. The apertures 31*a* may be sized so as to regulate the cooling flow through the side seal 30*a* and the transition side grooves 23. However it should be understood that apertures used may be the same size. As shown the apertures 31*a* have a reduced radius R1 as compared to the radius R2 of aperture 31*b*.

Additionally, side seal 30*a* may be made of only of a mesh 37, without the use of material sheets 38. It is also contemplated that the side seal 30*a* may be formed of layers of material sheets 38 and meshes 37, i.e. multiple strata of material sheets 38 and meshes 37 may be formed.

In addition to the cooling features provided by the side seal 30*a*, the side seal 30*a* is able to resiliently engage the transition side grooves 23. When the side seals 30*a* are placed in between transition ducts 20 into the transition side grooves 23 they are able to bend, twist and flex so as to continue to seal the spaces between transition ducts 20 and absorb possible deforming movement caused by the operation of the gas turbine engine 100. The side seal 30*a* is able to accommodate thermo-mechanical stresses that develop in a radial direction, an axial direction and a circumferential direction between the transition ducts 20 during the use of the gas turbine engine 100. This is due to the flexibility of the mesh 37 that forms part of the side seal 30*a*. The resiliency of the mesh 37 aids in the compression of the side seals 30*a* within the transition side grooves 23. This compression reduces wear of the side seal 30*a*.

Figure 12:
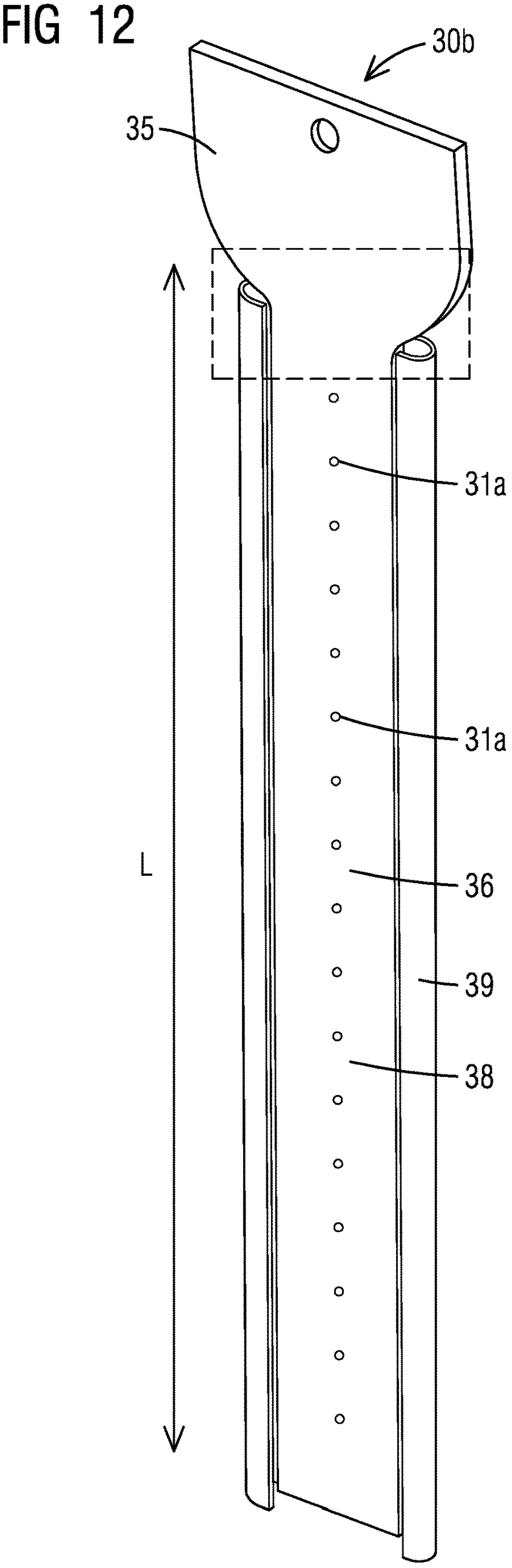
FIG. 12 shows a side seal made in accordance with an embodiment of the present invention.

FIG. 12 shows a side seal 30*b* made in accordance with another embodiment of the present invention. The side seal 30*b* has an upper body portion 35 and lower body portion 36. A clip 39 is attached to the lower body portion 36 and extends along the lengthwise direction L of the lower body portion 36. The clip 39 functions as a biasing structure that compressively engages the transition side grooves 23. The compressive engagement prevents vibrations of the side seal 30*b* when inserted. The clip 39 used in FIG. 12 is a c-clip. Clips 39 other than c-clips may be used, such as irregular shaped or angular shaped, provided the clip 39 can provide a compression engagement with the transition side grooves 23. Apertures 31*a* may be formed in the lower body portion 36 along the lengthwise direction L of the side seal 30*b*. However it should be understood that the side seal 30*b* can also be formed without apertures 31*a*.

Figure 13:
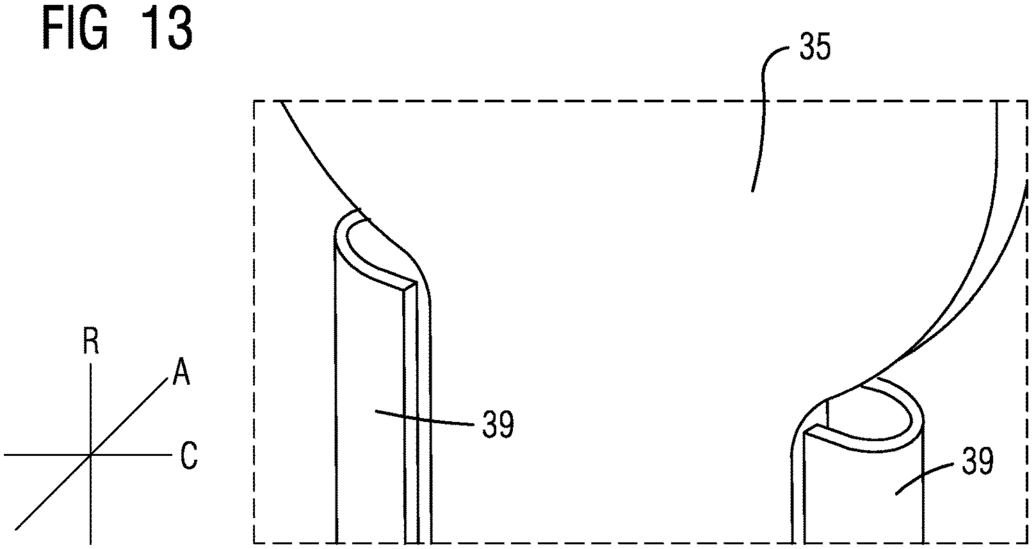
FIG. 13 shows a close up view of the side seal shown in FIG. 12.

FIG. 13 shows a close-up view of the clip 39 attached to the lower body portion 36 of the side seal 30*b*. The clip 39 may be attached to the lower body portion 36 by spot welding, brazing, or other art recognized means. The biasing structure created by clip 39 is biased so that it pushes in the axial direction A against the sides of the grooves 23. This biasing structure forms a compression fitted engagement between transition side rails 22 and the clip 39 and prevents the side seal 30*b* from being dislodged.

Figure 14:
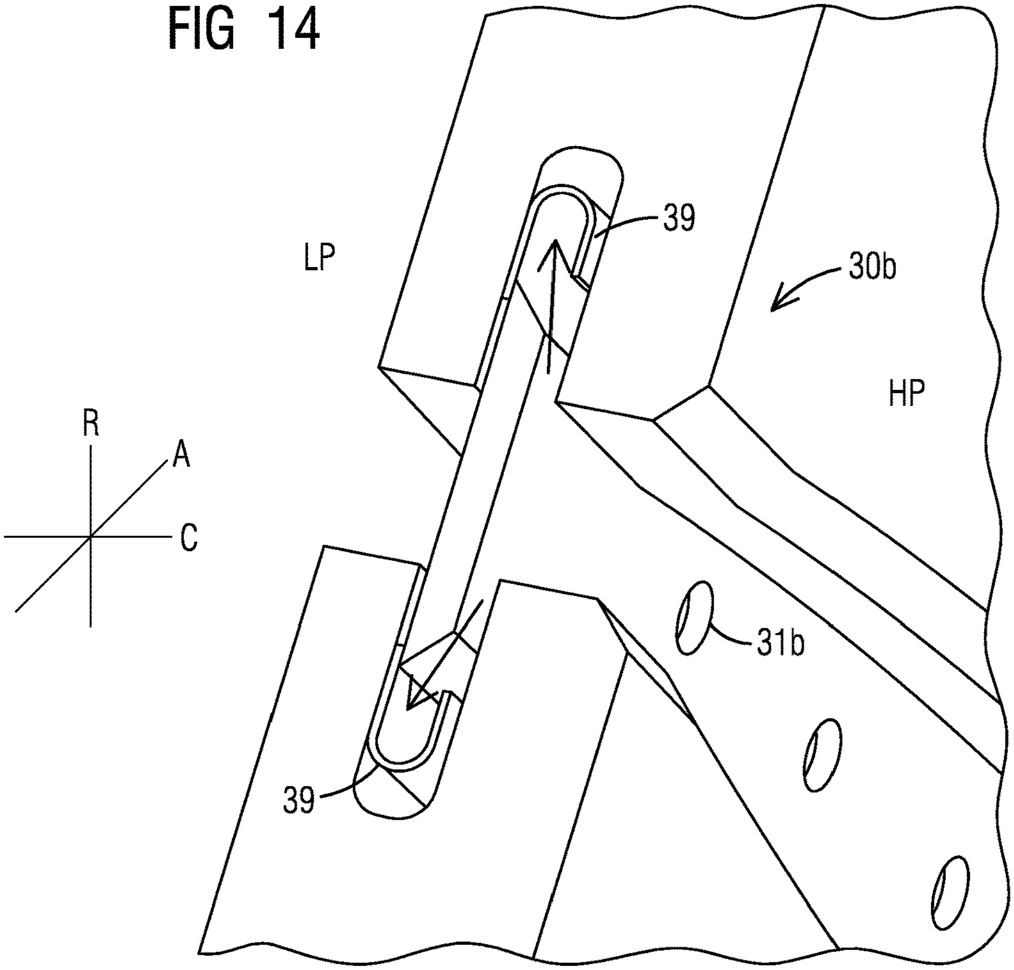
FIG. 14 shows a top down view of the side seal shown in FIG. 12 inserted between adjacent transition ducts.

FIG. 14 shows a top down view of the side seal 30*b* shown in FIG. 12 inserted between adjacent transition ducts 20. In the view shown the top body portion 35 is not shown so as to provide a clearer view of the side seal 30*b*. From this view it can be seen that the clip 39 extends from the portion of the side seal 30*b* that faces the low pressure area LP and curls around towards the portion of the side seal 30*b* that faces the high pressure area HP. In the view shown, the curled feature of the side seal 30*b* forms a C shape and provides the biasing features of the clip 39 that enables the compression fit. FIG. 14 also shows that air from the high pressure area (HP) can pass through the plurality of apertures 31*a* cooling the lower body portion 36 and providing a restricted flow of air through the side seal 30*b*. Additionally, air from the high pressure area HP can also impact the clip 39 to further bias the side seal 30*b* towards the sides of the transition side grooves 23 and prevent vibration of the side seal 30*b*. The compression fit of the clip 39 also permits the side seal 30*b* to further resiliently engage the transition side grooves 23 by accommodating thermo-mechanical stresses that develop in a radial direction, an axial direction and a circumferential direction between the transition ducts 20 during the use of the gas turbine engine 100.

Figure 15:
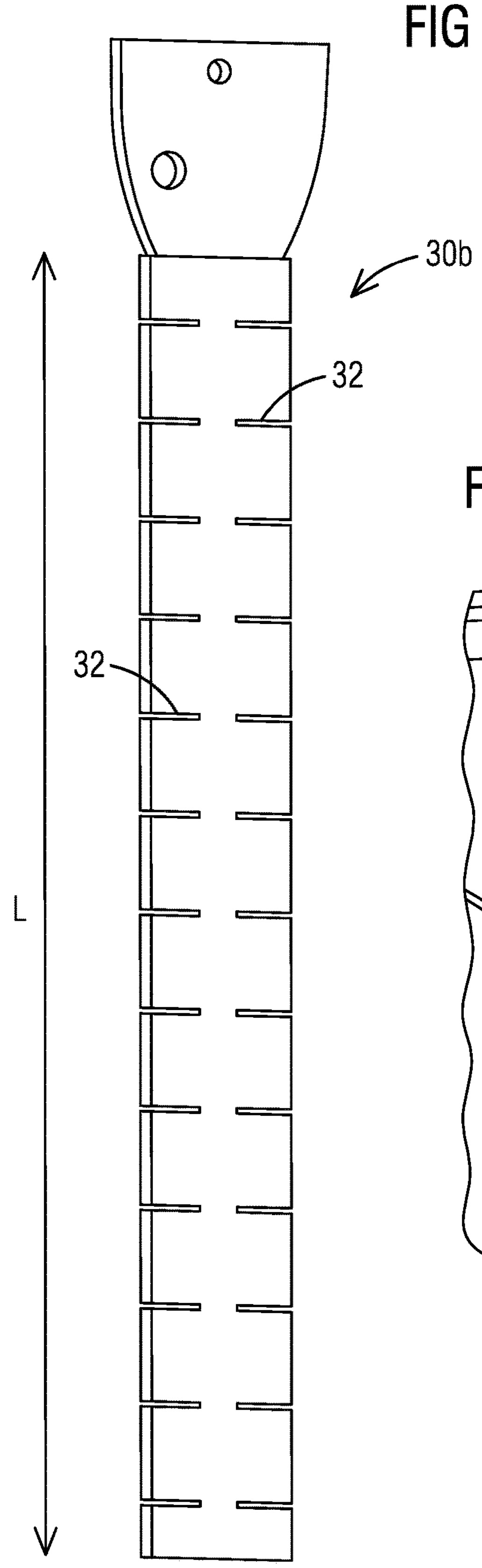
FIG. 15 shows a view of an alternative embodiment of the side seal shown in FIG. 12 without the clip attached for clarity and with slits formed in the lower body portion.
Figure 16:
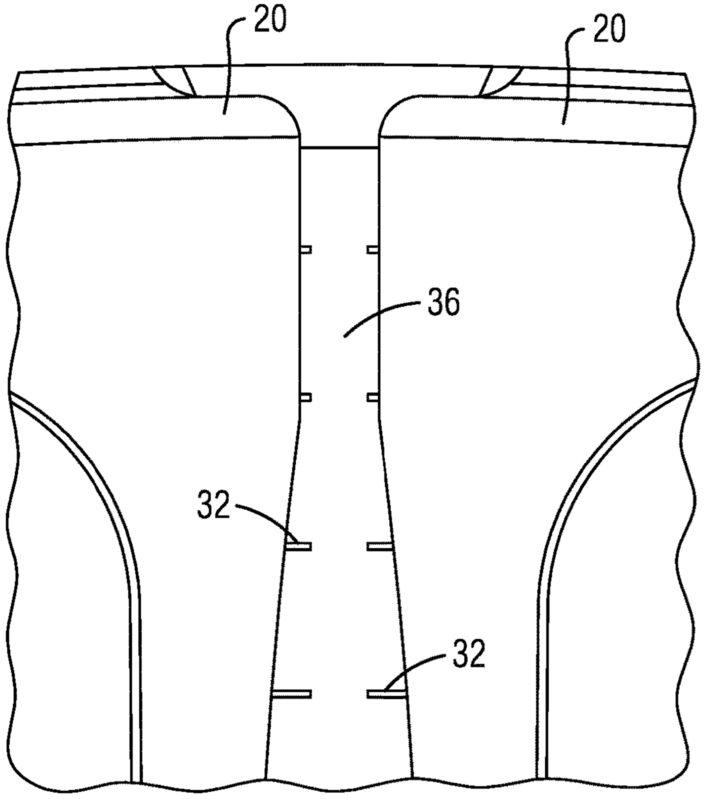
FIG. 16 shows a view of the side seal shown in FIG. 15 inserted between adjacent transition ducts.

FIG. 15 shows an alternative embodiment of the side seal 30*b* where a plurality of slits 32 are formed along the lengthwise direction L of the lower body portion 36. The slits 32 extend in a perpendicular direction with respect to the radial direction R when inserted into the transition side grooves 23. However, the slits 32 may extend at angles with respect to the Radial direction R in some embodiments. The slits 32 may also function as cooling features for the side seal 30*b*. FIG. 16 show the side seal 30*b* inserted between transition ducts 20. The slits 32 may permit air from the high pressure side HP to move through the side seal 30*b* to the low pressure side LP. In addition to the slits 32 functioning as a cooling feature, the slits 32 further reduce the rigidity of the lower body portion 36 and permits bending and twisting of the side seal 30*b* during activity of the gas turbine engine 100. This further permits side seal 30*b* to resiliently engage the transition side grooves 23 by accommodating thermo-mechanical stresses that develop in a radial direction, an axial direction and a circumferential direction between the transition ducts 20 during the use of the gas turbine engine 100.

FIG. 17 shows a side seal 30*c* made in accordance with another embodiment of the present invention. This side seal 30*c* is made with stacked segments 40 that articulate. A tie rod 41 is inserted into the stack of segments 40 through tie-hole 42. The tie rod 41 may be welded into place. The stack of segments 40 and the tie rod 41 form side seal 30*c*.

FIG. 18 is a close up view of the side seal 30*c* that shows a transparent view of the tie rod 41 inserted into a segment 40 through the ball joint 43. Ball joints 43 may be formed between each segment 40. The ball joint 43 may be integrally formed with the segments 40. The ball joints 43 permit locking of the segments 40 and allow swivelling/rotation between each of the respective segments 40. The tension between each respective segment 40 may be set and adjusted via the tie rod 41. FIG. 19 shows the joining of the segments 40 with the ball joints 43.

Figure 20:
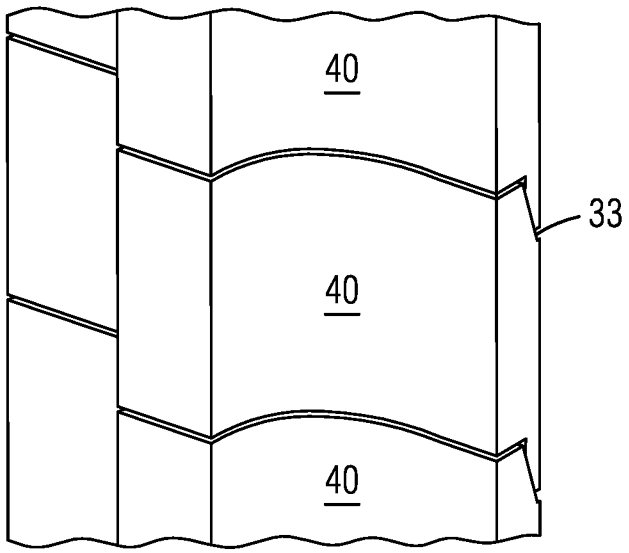
FIG. 20 is a close up view of the side seal shown in FIG. 17 showing a cooling gap between the two segments.
Figure 21:
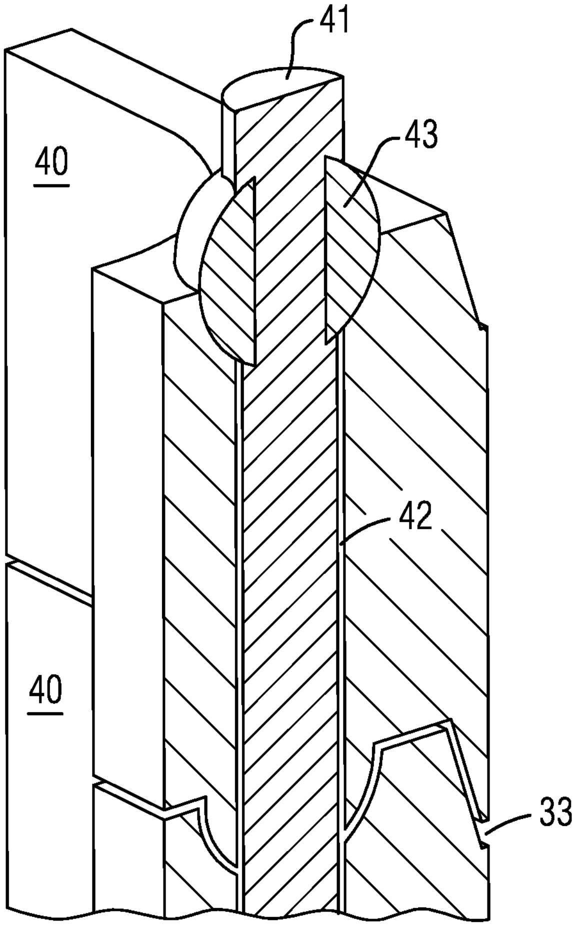
FIG. 21 is sectional view of the side seal shown in FIG. 17.

FIG. 20 is a close up view of a stack of segments 40 that have been assembled. The segments 40 may have gaps 33 between each segment 40 to further assist in the movement of the segments 40. The segments 40 and gaps 33 forming the articulated side seal 30*c* allow it to resiliently engage the transition side grooves 23 by accommodating thermo-mechanical stresses that develop in a radial direction, an axial direction and a circumferential direction between the transition ducts 20 during the use of the gas turbine engine 100. The articulation of each individual segment 40 is primarily in the axial direction. Due to the individual segments 40, each segment 40 can move in separate axial directions. In this way one segment 40 may be able adjust to movement in one axial direction while another segment 40 may be able to adjust movement in an opposite axial direction, FIG. 21 is a cut away view of an assembled side seal 30*c* showing the insertion of the tie rod 41 through the ball joint 43 and the segments 40. The gaps 33 may also permit some cooling air to pass from the high pressure area HP to the low pressure area LP to provide some cooling to the side seal 30*d* when the side seal 30*d* is inserted between the transition ducts 20

Figure 22:
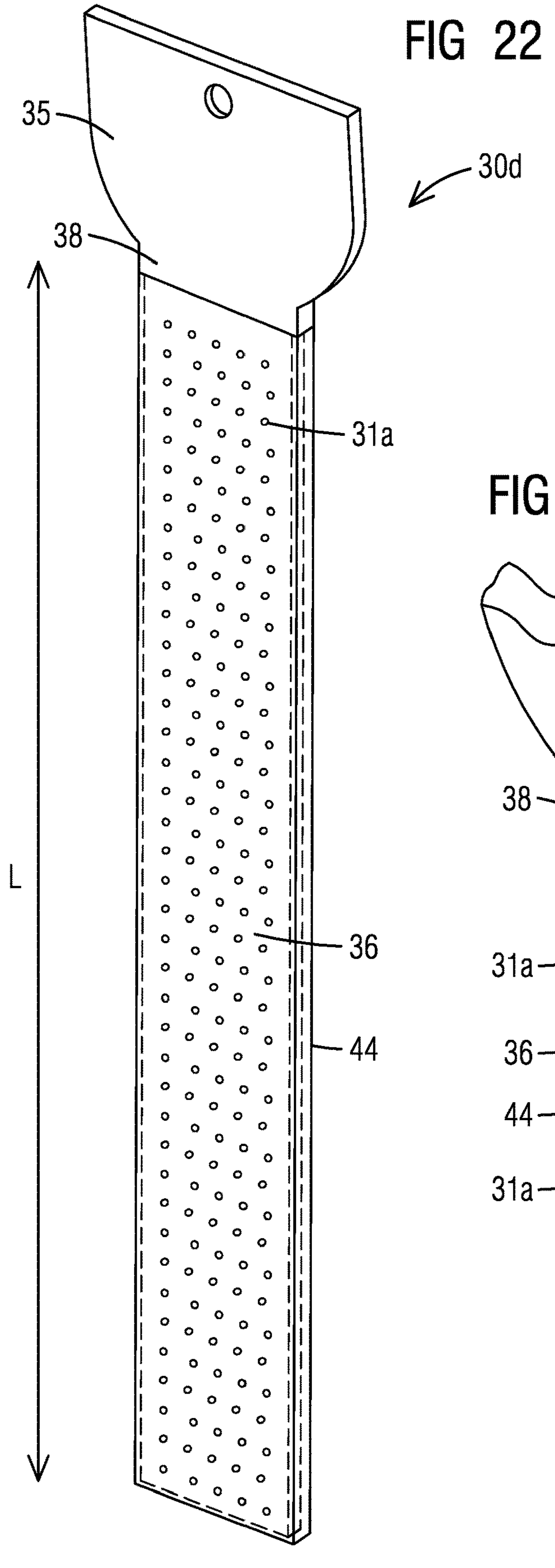
FIG. 22 shows a side seal made in accordance with an embodiment of the present invention.

FIG. 22 shows a side seal 30*d* made in accordance with another embodiment of the present invention. The side seal 30*d* comprises an upper body portion 35 and lower body portion 36. Surrounding and enveloping a material sheet 38 is a metal cloth 44 forming the lower body portion 36. This is accomplished by layering metal cloth 44 over a material sheet 38. The metal cloth 44 may be a nickel based alloy. The thickness of the metal cloth 44 can vary and depends on the thickness of the wire used during the weaving process. Preferably a 0.1 mm wire thickness is used which result in a metal cloth 44 thickness of about 0.2 mm, however it should be understood that other thickness can be used. Preferably the thickness of the side seal 30*d* is about 3.0 mm which may equal 6 layers of metal cloth 44 (wrapped around or stacked per side) with a material sheet 38 thickness of 0.6 mm. The material sheet 38 may be, for example, Haynes 188, Inco X750, Inco 718 or an equivalent material. The thinness of the material sheet 38 is a result of having a side seal 30*d* that can withstand the rigors of sealing between transition ducts while being robust enough to survive the pressure delta between the high pressure HP side and the low pressure side LP. Flexibility of the material sheet 38 is determined by the thickness and heat treatment can be used to control the integrity.

The metal cloth 44 and material sheet 38 are brazed or welded together forming the lower body portion 36. The amount of layering of the metal cloth 44 can be varied in order to control the size of the side seal 30*d* depending on the side of the transition side grooves 23 in which they are to be inserted. Additionally it is possible to provide alternating layers of metal cloths 44 and material sheets 38 in order to form a layered structure. The size of the side seal 30*e* can be used in order to control and prevent leaks. The amount of layering of the metal cloth 44 can compressively engage the transition side grooves by providing a biased structure of metal cloth 44. Additionally the metal cloth 44 may further permit side seal 30*d* to resiliently engage the transition side grooves 23 by accommodating thermo-mechanical stresses that develop in a radial direction, an axial direction and a circumferential direction between the transition ducts 20 during the use of the gas turbine engine 100.

Figure 23:
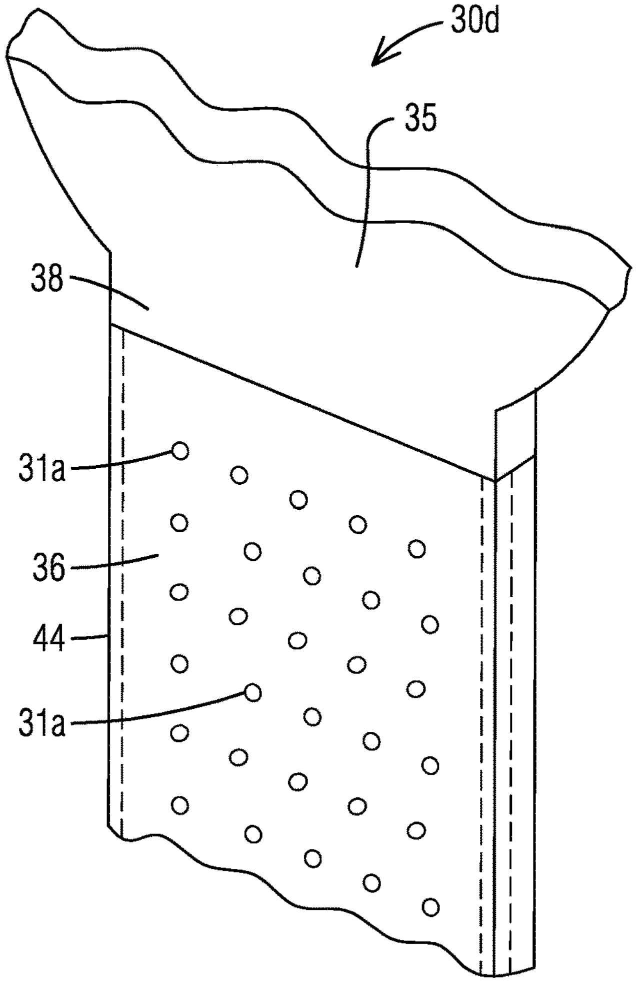
FIG. 23 shows a close up view of the side seal shown in FIG. 22 illustrating the material sheet beneath the metal cloth.
Figure 24:
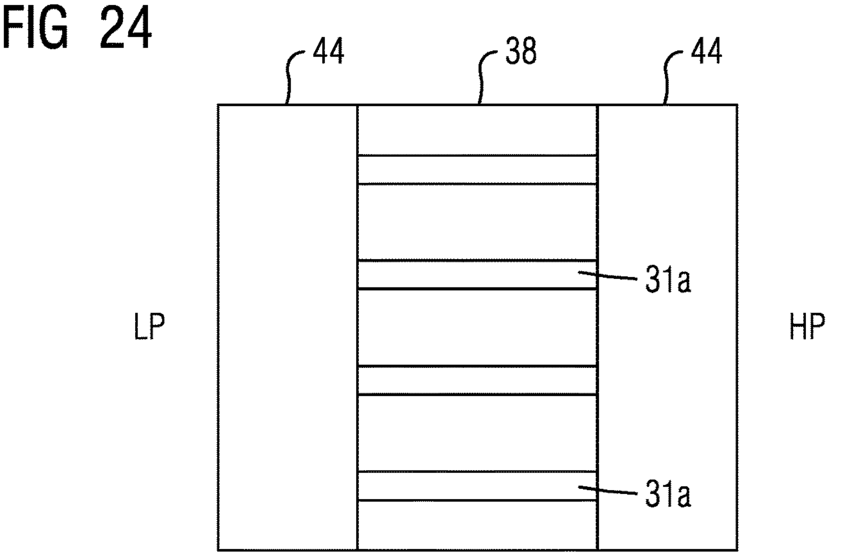
FIG. 24 is a diagrammatic view of the interior of side seal shown in FIG. 22.

FIG. 23 shows metal cloth 44 in a transparent manner so as to provide a view of the material sheet 38 and the apertures 31*a* that may be formed therein. The apertures 31*a* allow air to flow from the high pressure area HP through the material sheet 38 and into the metal cloth 44. FIG. 24 diagrammatically represents the apertures 31*a* formed in the material sheet 38 providing passage for air from one layer of metal cloth 44 to another.

Figure 25:
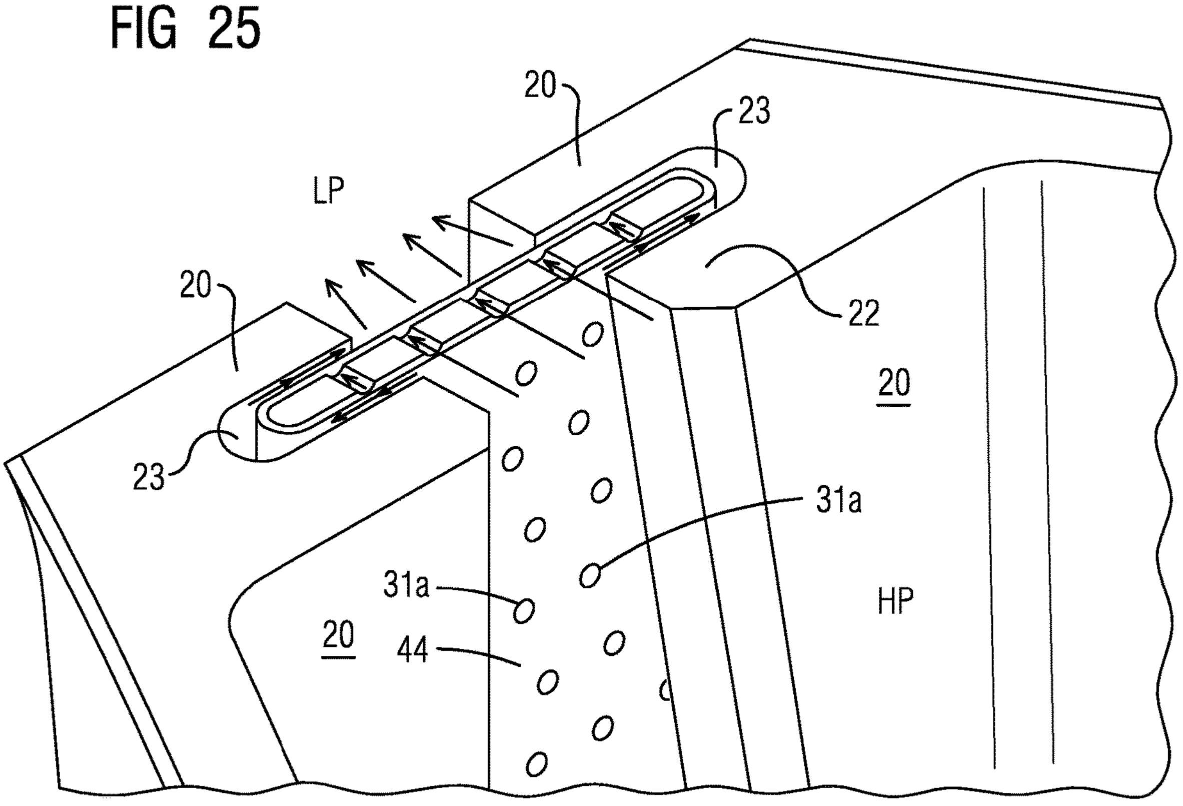
FIG. 25 is a view of the side seal shown in FIG. 22 inserted between adjacent transition ducts.

FIG. 25 shows a top down view of the side seal 30*d* shown in FIG. 22 inserted between adjacent transition ducts 20. In the view shown the top body portion 35 is not shown so as to provide a clearer view of the side seal 30*d*. FIG. 25 shows that air from the high pressure area HP can pass through the plurality of apertures 31*b* through the wire cloth 44. The wire cloth 44 permits air that enters through the apertures 31*a* to pass through the wire cloth 44 then pass through the material sheet 38 and again through the wire cloth 44 permitting a restricted flow of air through the side seal 30*d*. The cooling flow of air provides cooling of the side seal 30*d* and the transition side grooves 23 and reduces wear caused by heat.

Figure 26:
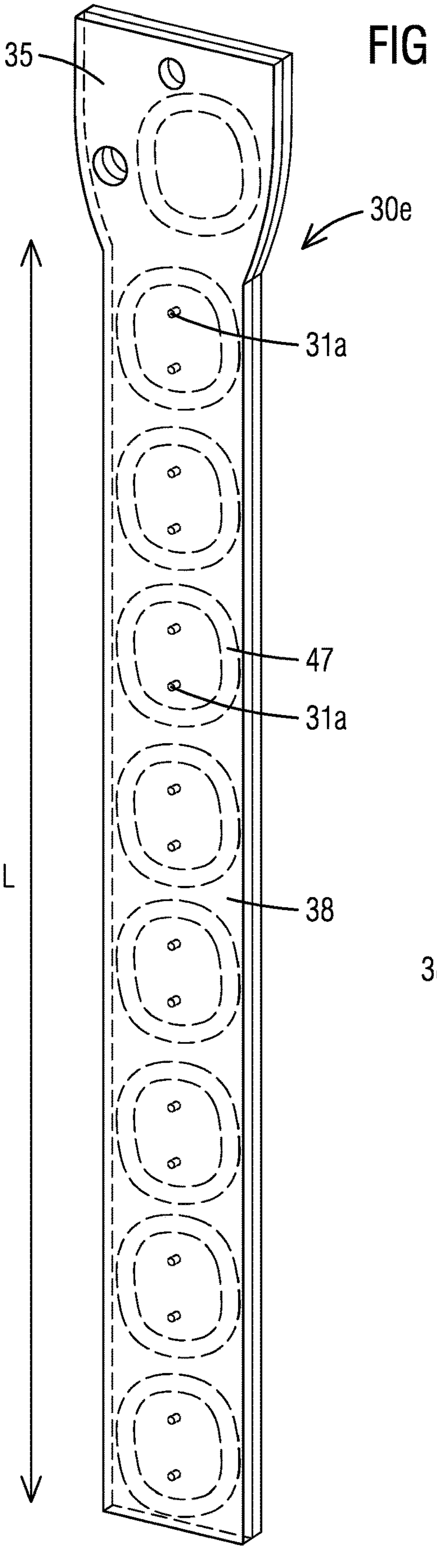
FIG. 26 shows a side seal made in accordance with an embodiment of the invention.

FIG. 26 shows a side seal 30*e* made in accordance with another embodiment of the present invention. The side seal 30*e* has an upper body portion 35 and a lower body portion 36. Forming the lower body portion 36 are material sheets 38 that are placed on top of wave washers 47. Further shown in FIG. 26 are apertures 31*a* that are formed on the surface of the material sheet 38 that will face the low pressure area LP in the gas turbine combustor 100 when inserted into transition side grooves 23. In the embodiment shown in FIG. 26 the layering using material sheets 38 and wave washers 47 occurs in the upper body portion 35 and the lower body portion 36. However, it should be understood that the layering may occur in only the lower body portion 36.

Figure 27:
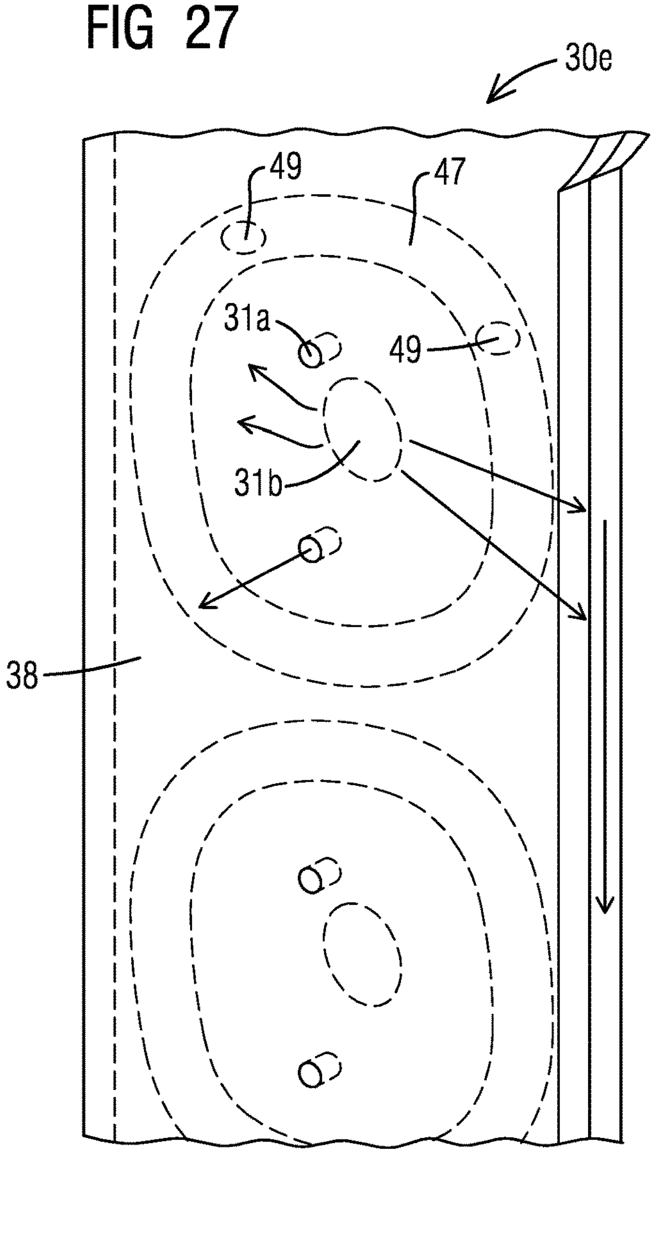
FIG. 27 is a close up view of the side seal shown in FIG. 26 further illustrating the cooling features found in the material sheets.

FIG. 27 shows a view of the lower body portion 36 of the side seal 30*e* with the material sheets 38 partially transparent so as to enable viewing of the interior of the side seal 30*e*. The material sheets 38 may be spot-welded to wave washers 47 at weld 49. The wave washers 47 are a biasing structure that compressively engages the transition side grooves 23. The compression that occurs allows the surfaces of the side seal 30*e* to be biased in a direction towards the surfaces of the transition side rails 22. This permits a more secure engagement in comparison with existing side seals that are not compressed and thus not biased in a direction towards the surfaces of the side rails 22.

Additionally the wave washers 47 may further permit side seal 30*e* to resiliently engage the transition side grooves 23 by accommodating thermo-mechanical stresses that develop in a radial direction, an axial direction and a circumferential direction between the transition ducts 20 during the use of the gas turbine engine 100.

Formed in the surface of the material sheet 38 that faces the low pressure area LP when inserted into transition side grooves 23 are apertures 31*a*. There are two apertures 31*a* for every aperture 31*b* shown in FIG. 27, however it should be understood that the invention is not limited to that configuration of apertures 31*a* and apertures 31*b*. Formed in the surface of the material sheet 38 that faces the high pressure area HP is an aperture 31*b*. The aperture 31*b* is located at a location corresponding to the center region of a wave washer 47, however it should be understood that aperture 31*b* may be located at other locations in addition to the region corresponding to the center region of the wave washer 47.

FIG. 28 is a diagrammatic view of the side seal 30*e* shown in FIG. 26. Apertures 31*a* have a smaller radius R3 than apertures 31*b* having radius R4. The apertures 31*b* permit air from the high pressure area HP to pass through the lower body portion 36 of the side seal 30*e* and pass through the apertures 31*a*. The apertures 31*a* permit a restricted flow of air. Controlling the size of the apertures 31*a* can regulate the flow of air through the side seal 30.

Figure 30:
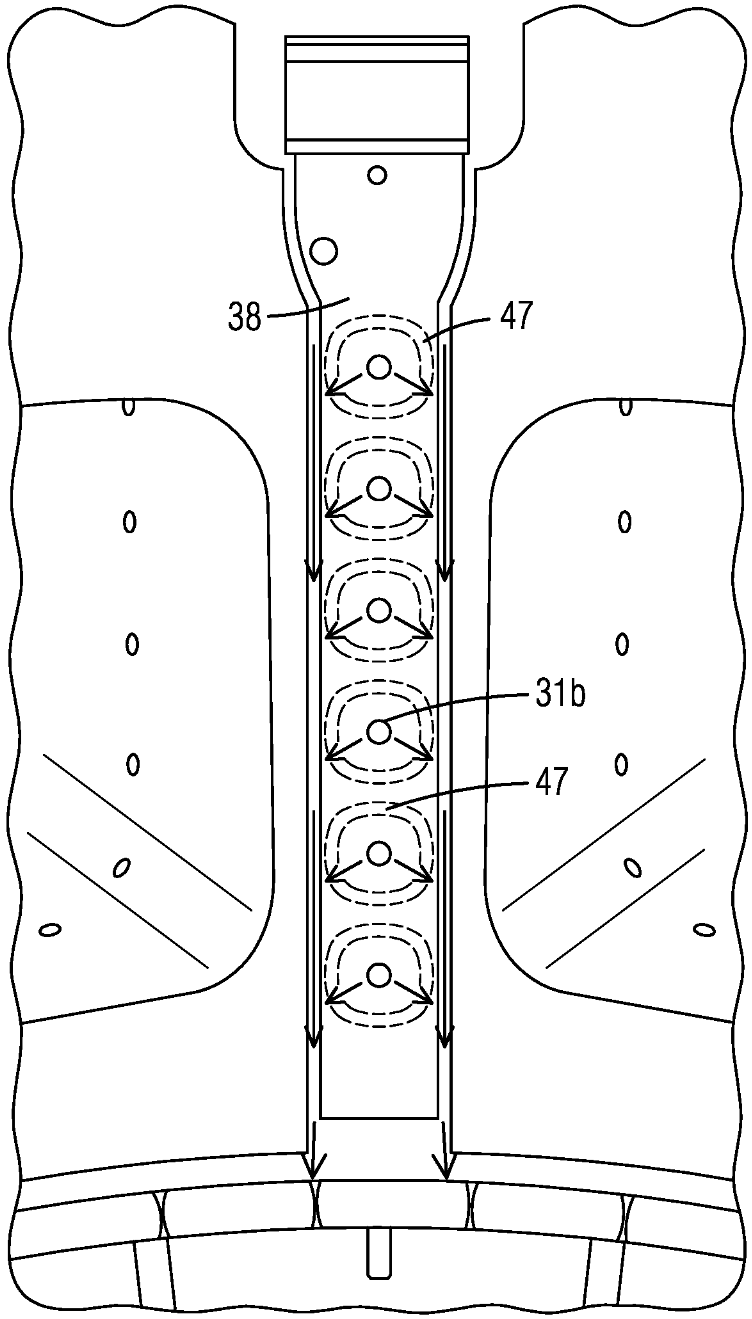
FIG. 30 is a view of the interior of the side seal shown in FIG. 26 inserted between adjacent transition ducts.

FIG. 29 is a view of side seal 30*e* located between the transition ducts 20 that shows the cooling air entering into the apertures 31*b* located in the material sheet 38 from the high pressure area. FIG. 30 shows the interior of the side seal 30*e* illustrating the passage of cooling air through the interior of the side seal 30*e*. FIG. 31 shows the exiting of cooling air from the side seal 30*e* through apertures 31*a* into the low pressure area LP. The apertures 31*a* may be sized so as to regulate the cooling flow through the side seal 30*a* and the transition side grooves 23. As shown the apertures 31*a* have a reduced radius R3 as compared to the radius R4 of aperture 31*b*.

FIG. 32 shows a top down view of the side seal 30*e* shown in FIG. 26 inserted between adjacent transition ducts 20. In the view shown the top body portion 35 is not shown so as to provide a clearer view of the side seal 30*e*. FIG. 9G shows air from the high pressure area HP can pass through the plurality of apertures 31*b* through the material sheet 38 pass wave washers 47 and through apertures 31*a* located in material the material sheet 38 facing the low pressure area. The cooling air that enters through the apertures 31*b* permits a restricted flow of air through the side seal 30*e*. The cooling flow of air provides cooling of the side seal 30*e* and the transition side grooves 23 and reduces wear caused by heat.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A gas turbine engine comprising:

a first transition duct comprising a first transition side rail having a first transition side groove that extends in a radial direction;

a second transition duct adjacent to the first transition duct, the second transition duct comprising a second transition side rail having a second transition side groove that extends in the radial direction; and a side seal radially inserted into the first transition side groove and the second transition side groove, the side seal comprising:

an upper body portion;

a lower body portion; and a plurality of wave washers that resiliently engages the first transition side groove and the second transition side groove to accommodate a thermo-mechanical stress that develops between the first transition duct and the second transition duct, wherein the lower body portion comprises a first material sheet proximate to a high pressure area and a second material sheet proximate to a low pressure area, wherein the first material sheet comprises a first plurality of apertures and the second material sheet comprises a second plurality of apertures, and wherein the first plurality of apertures on the first material sheet are larger than the second plurality of apertures on the second material sheet, and wherein the plurality of wave washers located between the first material sheet and the second material sheet.

2. The gas turbine engine of claim 1, wherein the lower body portion comprises a material sheet.

3. The gas turbine engine of claim 1, wherein the lower body portion comprises a plurality of apertures.

4. The gas turbine engine of claim 1, wherein the lower body portion has a width that is smaller than a width of the upper body portion.

5. A gas turbine engine comprising:

a first transition duct comprising a first transition side rail having a first transition side groove that extends in a radial direction;

a second transition duct adjacent to the first transition duct, the second transition duct comprising a second transition side rail having a second transition side groove that extends in the radial direction; and a side seal radially inserted into the first transition side groove and the second transition side groove, the side seal comprising:

an upper body portion;

a lower body portion defining a solid plate having a first planar surface, a second planar surface opposite to the first surface, a first edge formed at one side of the first planar surface and the second planar surface, and a second edge formed at an opposite side of the first surface and the second surface; and a plurality of slits formed as openings on the lower body portion, wherein the plurality of slits cut through the first planar surface and the second planar surface from the first edge toward the second edge, and wherein the slits resiliently engages the first transition side groove and the second transition side groove to accommodate a thermo-mechanical stress that develops between the first transition duct and the second transition duct.

6. The gas turbine engine of claim 5, wherein the lower body portion comprises a material sheet.

7. The gas turbine engine of claim 5, the lower body portion has a width that is smaller than a width of the upper body portion.

8. A gas turbine engine comprising:

a first transition duct comprising a first transition side rail having a first transition side groove that extends in a radial direction;

a second transition duct adjacent to the first transition duct, the second transition duct comprising a second transition side rail having a second transition side groove that extends in the radial direction; and a side seal radially inserted into the first transition side groove and the second transition side groove, the side seal comprising:

an upper body portion;

a lower body portion having a first surface and a second surface opposite to the first surface; and a layer of metal cloth surrounding and enveloping the first surface and the second surface, the metal cloth on the first surface and the second surface being an outermost surface between the lower body portion and the first transition side groove and the second transition side groove, and wherein the metal cloth engages the first transition side groove and the second transition side groove to accommodate a thermo-mechanical stress that develops between the first transition duct and the second transition duct.

9. The gas turbine engine of claim 8, wherein the lower body portion comprises a material sheet.

10. The gas turbine engine of claim 8, wherein the lower body portion comprises a plurality of apertures.

11. The gas turbine engine of claim 8, wherein the lower body portion has a width that is smaller than a width of the upper body portion.

* * * * *